Jan. 9, 1951 A. F. LABROZZI ET AL 2,537,837

CLAMP-ON TOOL

Filed Oct. 22, 1947

Inventors:
Anthony F. Labrozzi
John R. Potach
by their Attorneys
Howson & Howson Patented Jan. 9, 1951

2,537,837

UNITED STATES PATENT OFFICE 2,537,837

CLAMP-ON TOOL

Anthony F. Labrozzi and John R. Potack, Philadelphia, Pa., assignors to Carey-McFall Co., Philadelphia, Pa., a corporation of Pennsylvania Application October 22, 1947, Serial No. 781,534

2 Claims. (Cl. 29—96)

This invention relates to new and useful improvements in cutting tools, and more particularly to cutting tools of the so-called clamp-on type.

In the use of so-called clamp-on tools wherein a selected cutting tip or element is interchangeably clamped or secured in a tool shank or body, difficulty very often is encountered because the cutting tip becomes displaced or dislodged from its correct position with reference to the tool shank or body. This is particularly true in the cases where such tools are employed in internal machining operations for the reason that the clearance tolerances are quite close and any slight misalignment in the tool support and associated mechanism will cause the cutting tip to be dislodged from the tool as the latter is withdrawn at the completion of the work.

With the foregoing in mind, the principal object of the present invention is to provide a clamp-on tool of the type described wherein the cutting tip is fixedly secured with respect to the tool shank or body against accidental displacement or movement relative thereto.

Another object of the invention is to provide a clamp-on tool of the character set forth wherein the cutting tip and clamp device embody novel features of construction and arrangement which provide an effective interlock between the cutting tip and the tool shank or body whereby accidental displacement or movement of the said cutting tip with respect to the shank or body is entirely eliminated.

A further object of the invention is to provide a novel clamp-on tool having the features and advantages described which is of relatively simplified construction, inexpensive to manufacture, and highly efficient and foolproof in operation and use.

These and other objects of the invention and the various features and details of the construction and operation thereof are hereinafter fully set forth and described with reference to the accompanying drawing, in which.

Figure 1:
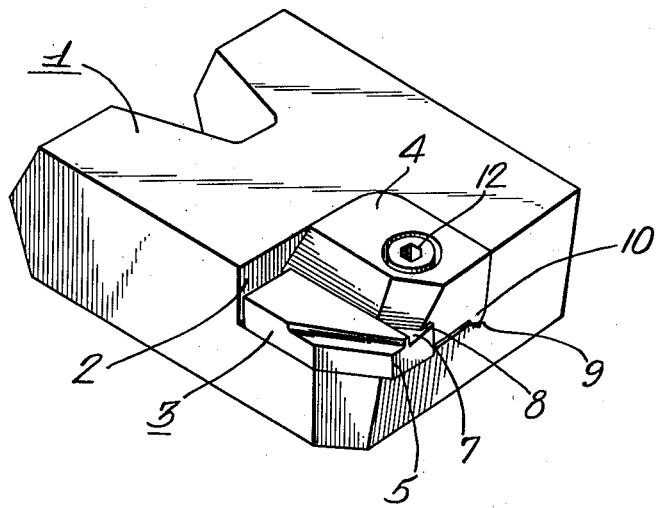
Fig. 1 is a view in perspective of a clamp-on tool made according to the present invention.
Figure 2:
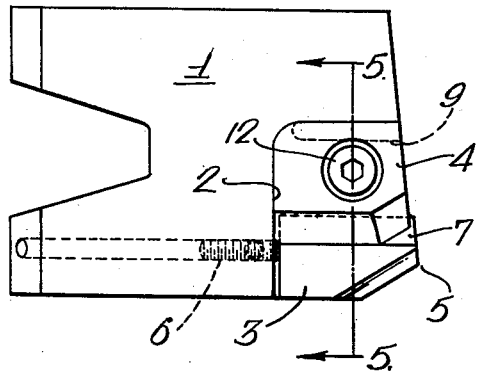
Fig. 2 is a plan view of the tool shown in Fig. 1.
Figure 3:
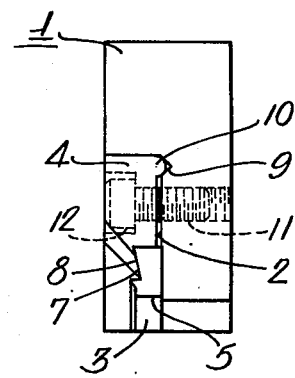
Fig. 3 is an end elevational view of the tool.
Figure 4:
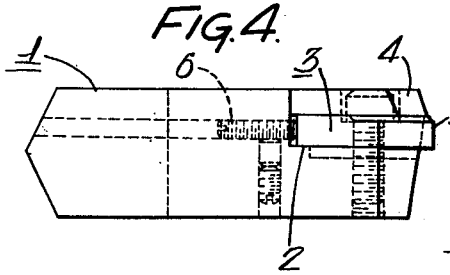
Fig. 4 is a side elevational view thereof.

Referring now to the drawing, a clamp-on tool made according to the present invention comprises a shank or body 1 which preferably is composed of a tough grade of steel. The shank or body 1 is of generally rectangular form having oppositely disposed parallel plane faces in one corner of one of which there is provided a recess 2 of predetermined configuration arranged to receive therein a cutting tip or element 3 and a clamp block 4 for securing the tip or element 3 in said recess 2.

In the illustrated embodiment of the invention the cutting tip or tool 3 is of predetermined shape or configuration providing a cutting edge 5 which projects furthermost from the shank or body 1 in position for engagement with the article or surface to be machined thereby. Minor adjustments of the cutting tip 3 and its edge 5 relative to the tool body may be effected by means of an adjusting screw 6 which is threaded internally of the body and disposed in backing engagement with the said tip 3.

Figure 5:
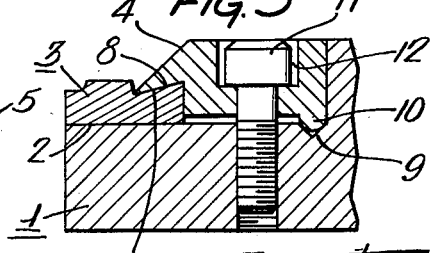
Fig. 5 is an enlarged fragmentary sectional view taken on line 5—5, Fig. 2.

In accordance with the present invention, the cutting tip 3 is provided with an angularly disposed upper surface portion 7 which extends longitudinally of the tool along the inner edge of the cutting tip 3 and declines laterally outward or transversely of the tool at an angle, for example, of about 15°. This angularly disposed surface portion 7 of the cutting tip 3 is adapted to be engaged upon by a correspondingly disposed under surface portion 8 provided on the clamp block 4 in the relation best shown in Fig. 5 of the drawing to provide an effective interlocking of the cutting tip 3 and clamp block 4. In addition to this, an interlock is provided between the clamp block 4 and the shank or body 1 of the tool by providing, in the bottom or base surface of the recess 2 along the longitudinal inner wall thereof, an elongated groove or channel 9 which is adapted to be engaged by an elongated ridge or rib 10 provided on the underside of the clamp block 4 adjacent the inner longitudinally extending edge thereof. As shown in the drawing, the ridge or rib 10 may be of substantially semi-circular cross-sectional configuration and the groove or channel 9 may be V-shape in cross-section.

The clamp block 4 is secured to the shank or body 1 in clamping engagement upon the cutting tip or element 3 by means of a clamp or bolt 11 which is threaded into said shank or body 1 and has its enlarged head portion 12 disposed within a recess or counterbore provided in the clamp 4 whereby the plane surface or face of the tool is preserved. It will be observed, therefore, that when the clamp block 4 is secured to the body or shank 1 with its rib or ridge 10 engaging the groove or channel 9 in the recess 2 of the tool body 1 and with the angular surface portion 8 of the said block 4 in clamping engagement upon the corresponding angular surface portion 7 of the cutting tip 3, there is provided an effective and efficient interlocking of the tip 3 to the body or shank 1 which precludes the possibility of accidental displacement or movement of the cutting tip 3 relative to said body or shank 1.

From the foregoing description, it will be observed that the present invention provides a clamp-on tool as set forth having novel features of construction and arrangement which provides an effected interlock between the cutting tip and the tool shank or body whereby the possibility of accidental displacement or movement of the cutting tip with respect to the shank or body is entirely eliminated. In addition, the invention provides a novel clamp-on tool having the features and characteristics described which is of relatively simplified construction, inexpensive to manufacture and highly foolproof and efficient in operation and use.

While a particular embodiment of the present invention has been illustrated and described, it is not intended to limit the invention to such disclosure and changes and modifications may be made therein and thereto within the scope of the following claims.

We claim:

1. A clamp-on tool comprising a member having a supporting surface and a groove extending in spaced parallel relation inwardly from an outer edge of said supporting surface, a cutting tip on said supporting surface and spaced outwardly from said groove, said cutting tip having an angularly disposed upper surface portion extending in parallel spaced relation to said groove and declining inwardly of said cutting tip, and a clamp secured to said member having a depending portion engaging said groove to provide an interlock between the clamp and member, and said clamp also having an angularly arranged under surface portion corresponding to the angular surface on said tip disposed in clamping engagement with the latter and providing an interlock between the clamp and tip.

2. A clamp-on tool comprising a member having a supporting surface and a V-shaped groove extending in spaced parallel relation inwardly from an outer edge of said supporting surface, a cutting tip on said supporting surface and spaced outwardly from said groove, said cutting tip having an angularly disposed upper surface portion extending in parallel spaced relation to said groove and declining inwardly of said cutting tip and a clamp secured to said member having a depending rib portion of substantially semicircular cross-sectional shape engaging said V-shaped groove to provide an interlock between the clamp and member, and said clamp also having an angularly arranged under surface portion corresponding to the angular surface on said cutting tip and disposed in clamping engagement with the latter to provide an interlock between the clamp and tip.

ANTHONY F. LABROZZI.
JOHN R. POTACK.

REFERENCES CITED

The following references are of record in the file of this patent:

UNITED STATES PATENTS

| Number | Name | Date |
|---|---|---|
| 1,319,443 | Wille | Oct. 21, 1919 |
| 1,456,552 | Henning | May 29, 1923 |

FOREIGN PATENTS

| Number | Country | Date |
|---|---|---|
| 639,824 | France | Mar. 17, 1928 |
| 880,991 | France | Jan. 15, 1943 |